US007991864B2

(12) United States Patent
Patel et al.

(10) Patent No.: US 7,991,864 B2
(45) Date of Patent: Aug. 2, 2011

(54) NETWORK ELEMENT DISCOVERY USING A NETWORK ROUTING PROTOCOL

(75) Inventors: Alpesh Patel, Pleasanton, CA (US);
Abhay Roy, Santa Clara, CA (US);
Rajeev Koripalli, San Jose, CA (US);
Kui Zhang, Cupertino, CA (US);
Praveen Joshi, San Jose, CA (US);
Syam Sundar Appala, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1034 days.

(21) Appl. No.: 11/429,516

(22) Filed: May 4, 2006

(65) Prior Publication Data

US 2007/0258387 A1 Nov. 8, 2007

(51) Int. Cl.
*G06F 15/173* (2006.01)
*G06F 15/177* (2006.01)
*H04L 12/28* (2006.01)

(52) U.S. Cl. ........ 709/223; 709/220; 709/221; 709/222; 709/226; 370/254

(58) Field of Classification Search .................. None
See application file for complete search history.

(56) References Cited

U.S. PATENT DOCUMENTS

| 6,826,605 B1* | 11/2004 | Mitra | 709/223 |
|---|---|---|---|
| 6,985,959 B1* | 1/2006 | Lee | 709/223 |
| 7,290,043 B1* | 10/2007 | Kuditipudi et al. | 709/223 |
| 7,697,419 B1* | 4/2010 | Donthi | 370/220 |
| 2003/0072262 A1* | 4/2003 | Cristallo | 370/229 |
| 2003/0118051 A1 | 6/2003 | Ooms | |
| 2004/0139126 A1* | 7/2004 | Thacker et al. | 707/203 |
| 2004/0196808 A1 | 10/2004 | Chaskar et al. | |
| 2005/0157880 A1* | 7/2005 | Kurn et al. | 380/279 |
| 2006/0013192 A1 | 1/2006 | Le et al. | |
| 2006/0039314 A1 | 2/2006 | Narayanan | |
| 2006/0092952 A1* | 5/2006 | Boutros et al. | 370/400 |
| 2006/0200856 A1* | 9/2006 | Salowey et al. | 726/5 |
| 2006/0259602 A1 | 11/2006 | Stewart et al. | |
| 2007/0165515 A1* | 7/2007 | Vasseur | 370/216 |

OTHER PUBLICATIONS

Lindem et al., "Extensions to OSPF for Advertising Optional Router Capabilities", Internet Draft, Apr. 2004, 8 pages.*
Lindem et al., "Extensions to OSPF for Advertising Optional Router Capabilities", Internet Draft, Apr. 2004, 8 pages.
International Searching Authority, "International Search Report", PCT/US07/67870, dated Jul. 16, 2008, 6 pages.
Claims, PCT/US07/67870, 4 pages.

(Continued)

*Primary Examiner* — Hassan Phillips
(74) *Attorney, Agent, or Firm* — Hickman Palermo Truong & Becker LLP

(57) ABSTRACT

A data processing apparatus comprises instructions to perform sending and receiving one or more messages conforming to a network routing protocol, such as Open Shortest Path First (OSPF); obtaining one or more information elements that specify one or more capabilities of the apparatus; creating a particular routing protocol message comprising an opaque advertisement that includes the one or more information elements; and sending the particular message on one of the network interfaces. For example, a router or switch that implements a network routing protocol can use OSPF Opaque Link State Advertisements to advertise and discover services and capabilities of other routers or switches.

16 Claims, 4 Drawing Sheets

OTHER PUBLICATIONS

Anonymous, "Configuring Cisco Discovery Protocol," from Cisco IOS Configuration Fundamentals Configuration Guide, Cisco Systems, Inc., San Jose, California, 2004, pp. 1-4.

Anonymous, "CDP: Cisco Discovery Protocol," Javvin, printed May 8, 2007, pp. 1-2.

J. Veizades et al., "Service Location Protocol," Internet Engineering Task Force (IETF) Network Working Group Request for Comments (RFC) 2165, Jun. 1997, published by The Internet Society, pp. 1-59.

E. Guttman et al., "Service Location Protocol, Version 2," IETF Network Working Group RFC 2608, Jun. 1999, published by The Internet Society, pp. 1-44.

R. Coltun, "The OSPF Opaque LSA Option," IETF Network Working Group RFC 2370, Jul. 1998, published by The Internet Society, pp. 1-13.

* cited by examiner

US 7,991,864 B2

NETWORK ELEMENT DISCOVERY USING A NETWORK ROUTING PROTOCOL

FIELD OF THE INVENTION

The present invention generally relates to network management. The invention relates more specifically to techniques for discovering the capabilities or services of network nodes and the services that network nodes provide.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Further, nothing in this patent document is admitted to be prior art by the applicant(s).

Discovering network nodes representing the endpoints of a network communication path is a basic issue in setting up a communication channel. In most cases, the endpoint is either known in advance, or some identifier is known and then used to discover the other information about the endpoint. For example, DNS lookup can be used, if the name of an available DNS server is previously configured in a device. Alternatively, Service Location Protocol (SLP), as defined in IETF RFC 2165 and RFC2608 can be used to locate an address of the endpoint.

Past approaches have included various methods of service detection and endpoint detection, generally based on manual deployment or provisioning and available networking standards. For networking devices from Cisco Systems, Inc., San Jose, Calif., and certain compatible devices, the Cisco Discovery Protocol (CDP) can be used to discovery Cisco devices that are on the same link as the discovering device—that is, one hop away—and their characteristics. Typically, a network administrator configures an endpoint or client with information about an available server, or some form of server load balancing is deployed to achieve transparency with respect to the location of the server.

However, manual provisioning is a deployment challenge, since all the nodes typically have to be re-configured when a new server or server pool is introduced to the network. In situations where server transparency is not feasible—for example, because the additional node cannot be hidden behind a load-balancing device—the manual provisioning approach is a deployment nightmare.

Further, when the nodes are network devices such as switches or routers, discovering what services are available at the nodes, and the capabilities of the nodes, is more challenging compared to locating clients, servers or other endpoints. In this context, there is a need for some method or mechanism providing automatic service and node capability discovery. It would be useful to have an approach in which manual provisioning is limited to a single new node that is deployed in the network. There is a need for an approach that allows all other nodes to learn about the new node, and that allows the new node to learn about the existing nodes in the network.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
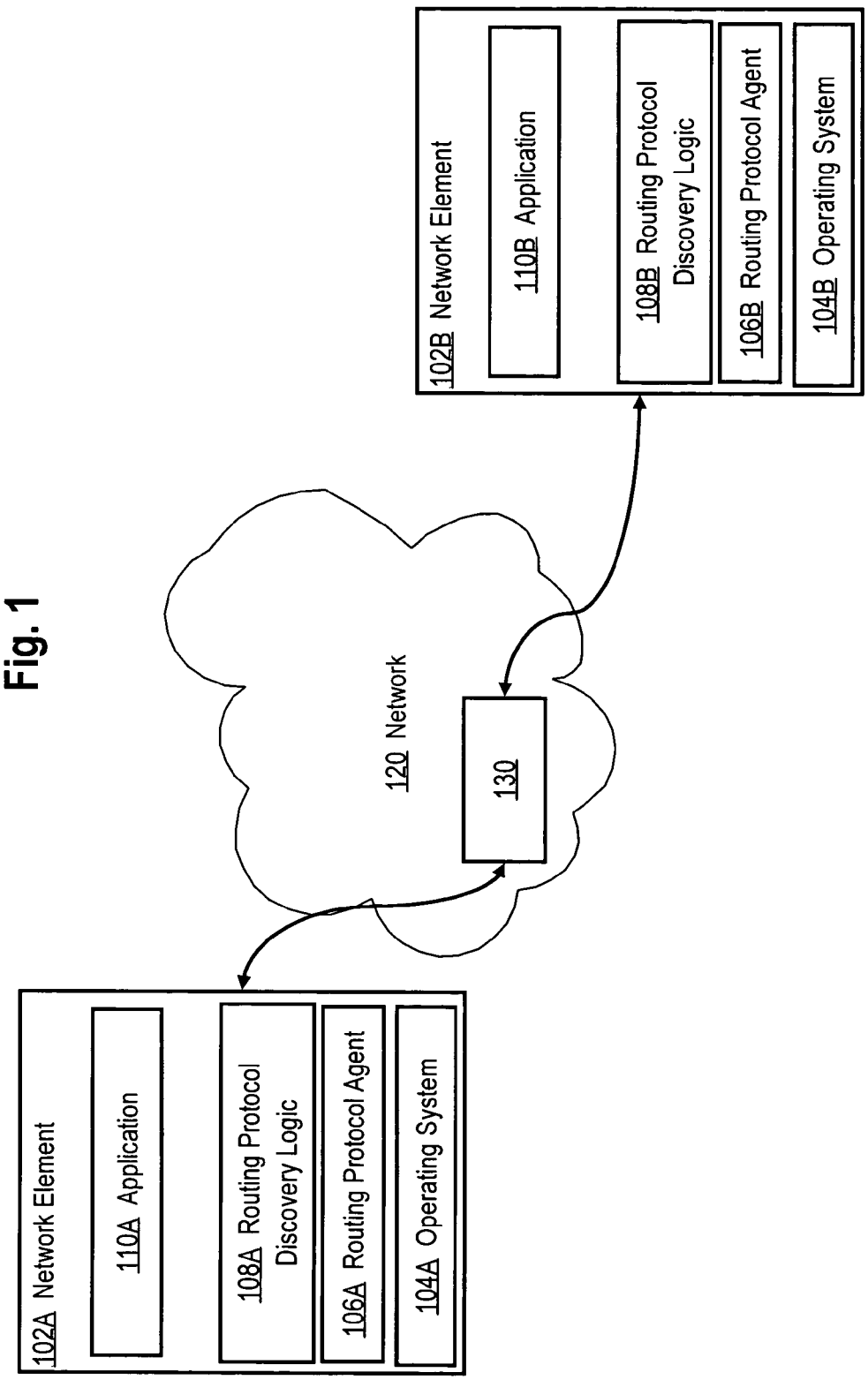
FIG. 1 is a block diagram that illustrates an overview of a network arrangement in which an embodiment may be used.

Apparatus and methods for network element capability discovery using a network routing protocol are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Example
3.0 Implementation Mechanisms—Hardware Overview
4.0 Extensions and Alternatives
1.0 General Overview The needs identified in the foregoing Background, and other needs and objects that will become apparent for the following description, are achieved in the present invention, which comprises, in one aspect, a data processing apparatus, comprising one or more processors; one or more network interfaces coupled to the processors and communicatively coupled to a telecommunications network; a computer-readable medium comprising one or more sequences of one or more instructions which, when executed by the one or more processors, cause the one or more processors to perform sending and receiving one or more messages conforming to a network routing; obtaining one or more information elements that specify one or more capabilities of the apparatus; creating a particular routing protocol message comprising an opaque advertisement that includes the one or more information elements; and sending the particular message on one of the network interfaces.

In one feature of this aspect, the apparatus further comprises sequences of instructions which, when executed by the processor, cause the processor to perform receiving, from a node that is coupled to the network, a second particular message comprising a second opaque advertisement that includes one or more second information elements that describe capabilities of the node; storing, in a data repository of the apparatus, an identification of the node in association with the one or more second information elements; determining one or more services or capabilities that the one or more second information elements describe; and creating and sending to the node, a request for the one or more services or capabilities.

In various embodiments, the network routing protocol comprises Open Shortest Path First (OSPF) protocol or Intermediate System/Intermediate System (IS/IS).

In various other features, the one or more information elements describe a version of a software element that is hosted on the apparatus; a role of a software element that is hosted on the apparatus; a policy that is used by a software element that is hosted on the apparatus; a digital certificate for a software element that is hosted on the apparatus; and a processing load metric for the apparatus.

In other aspects, the invention encompasses a method and a computer-readable medium configured to carry out the foregoing steps.

2.0 Structural and Functional Example

FIG. 1 is a block diagram that illustrates an overview of a network arrangement in which an embodiment may be used. A network element 102A is coupled to a telecommunications network 120 that includes a second network element 130, which is further coupled to another network element 102B. Network elements 102A, 130, 102B are routers, switches, or other elements of infrastructure of a packet-switched network.

In an example embodiment, network element 102A comprises an operating system 104A, routing protocol agent 106A, routing protocol discovery logic 108A, and application 110A. Operating system 104A supervises other software elements and controls the use of hardware resources. In one embodiment, operating system 104A is Cisco IOS® Software from Cisco Systems, Inc., San Jose, Calif., ION, or IOX. Alternatively, operating system 104A is LINUX or a BSD UNIX based operating system.

Routing protocol agent 106A comprises one or more software elements that implement a network routing protocol. Example routing protocols include OSPF, IS/IS, etc. Preferably, a link state protocol that provides link state messages, packets or advertisements (LSPs, LSAs) is used. Routing protocol agent 106A is shown in FIG. 1 as separate from operating system 104A, but in an alternative embodiment, the operating system includes the routing protocol agent. In a LINUX embodiment, routing protocol agent 106A can comprise the Quagga/Zebra implementation of OSPF, which supports Opaque LSAs as further described herein.

Figure 2:
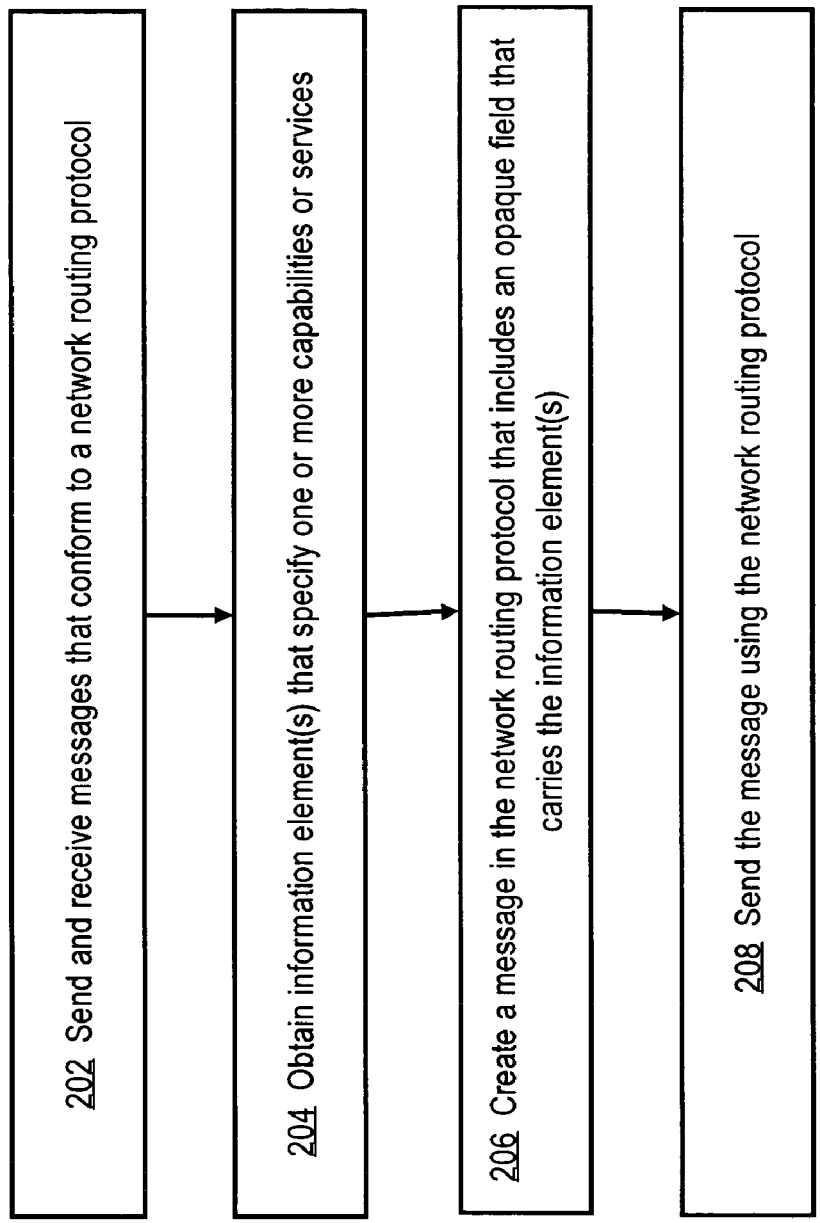
FIG. 2 is a flow diagram that illustrates a high level overview of one embodiment of a method for network element capability discovery using a network routing protocol, as performed by a discovering element.
Figure 3:
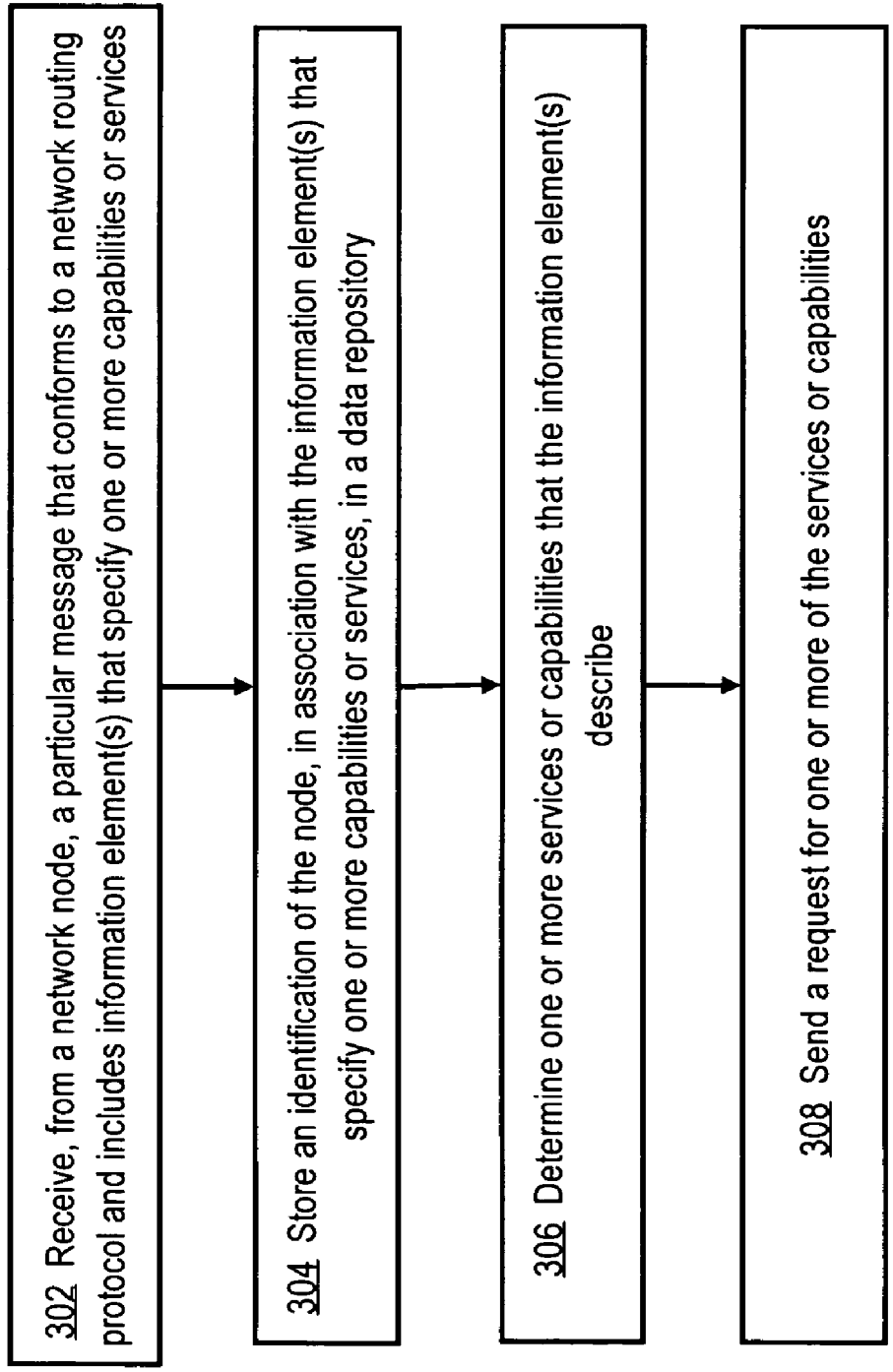
FIG. 3 is a flow diagram that illustrates a high level overview of one embodiment of a method for network element capability discovery using a network routing protocol, involving processing received discovery information.

Routing protocol discovery logic 108A comprises one or more software elements that implement the functions and processes that are described further herein in connection with FIG. 2, FIG. 3. Generally, routing protocol discovery logic 108A functions to determine, using routing protocol messages or packets, capabilities and services of network element 102B or other network elements in network 120. Routing protocol discovery logic 108A is shown in FIG. 1 as separate from operating system 104A, but in an alternative embodiment, the operating system includes the routing protocol discovery logic.

Application 110A represents any other functional element of network element 102A that can benefit from determining services or capabilities of another network element. For example, application 110A may comprise an agent, service, blade, or process that might change its behavior depending on the services or capabilities of other network elements. As one specific example, application 110A is an application-oriented networking services (AONS) blade. AONS routers are available from Cisco Systems, Inc.

Network element 102B has an internal structure similar to network element 102A and comprises an operating system 104B, routing protocol agent 106B, routing protocol discovery logic 108B, and application 110B having the characteristics given above for operating system 104A, routing protocol agent 106A, routing protocol discovery logic 108A, and application 110A. Network element 130 is a conventional router or switch that does not include the foregoing elements. Alternatively, network element 130 has the same structure as network elements 102A, 102B.

For purposes of illustrating a clear example, FIG. 1 shows three network elements 102A, 102B, 130. However, other practical embodiments may include any number of network elements distributed across one or more networks or internetworks. Network 120 may be a LAN, WAN, internetwork, or combination thereof. As further described below, network elements 102A, 102B, 130 send and receive capability discovery message data using a routing protocol as a transport mechanism. The network elements 102A, 102B, 130 can "peer" with other routing elements, such as routers and switches, to exchange routing information using the routing protocol.

FIG. 2 is a flow diagram that illustrates a high level overview of one embodiment of a method for network element capability discovery using a network routing protocol, as performed by a discovering element. FIG. 3 is a flow diagram that illustrates a high level overview of one embodiment of a method for network element capability discovery using a network routing protocol, involving processing received discovery information. For purposes of illustrating a clear example, FIG. 2 is described first with reference to steps that network element 102A performs to advertise its capabilities or services to network element 102B or other network elements.

At step 202, messages that conform to a network routing protocol are sent and received. For example, network element 102A sends and receives OSPF packets. Step 202 broadly represents initiation and use of a network routing protocol, such as OSPF, at a first network element. The particular content of the messages or packets is unimportant.

At step 204, one or more information elements are obtained that specify one or more capabilities or services. For example, routing protocol discovery logic 108A retrieves information from a configuration file, SNMP MIB, or application 110A that describes the attributes, capabilities or services of network element 102A. The particular mechanism that is used to obtain the information elements is not critical, provided that some mechanism is used to create or determine a set of information that describes one or more attributes, capabilities or services of the network element.

Example information that can be advertised in the information elements includes, but is not limited to, the network address of a network element; version identifying information for an application, operating system, agent or other logic that is hosted on the network element; a role of the network element or an application, agent or other logic that is hosted on the network element; policies that are configured on a node; a digital certificate of the node; software adapters that are available on a node; compression algorithms that are available on a node; and other information.

Other example information includes state values or attributes indicating state characteristics of a node. For example, information elements can comprise metrics indicating current processing load or capability of the node, to help a receiving node determine whether to route requests to the sending node; and other information about capabilities or services. Other state information of a node can be dynamically conveyed; for example, an increase or decrease in CPU load by a certain factor can trigger routing protocol discovery logic to initiate a new opaque advertisement that identifies the new CPU load value.

At step 206, a message is created in the network routing protocol that includes an opaque field that carries the information elements. For example, routing protocol discovery logic 108A creates an OSPF packet comprising an OSPF Opaque Link State Advertisement (opaque LSA) and the information elements are placed in a field of the opaque LSA designed in OSPF to carry opaque data. "Opaque," in this context, means not modified by a router or other device that implements the routing protocol and receives and forwards the message or packet. OSPF Opaque LSAs are defined in IETF RFC 2370. The information elements can be packaged in an OSPF Opaque LSA using a vendor-specific extension to the LSA, which defines the structure or format for the opaque data. The particular use of OSPF described herein is not contemplated in RFC 2370.

At step 208, the message is sent using the network routing protocol. For example, routing protocol discovery logic 108A hands off, to routing protocol agent 106A, the OSPF packet created in step 206, and the routing protocol sends the packet on an interface of network element 102A.

When the routing protocol is OSPF, sending the packet automatically causes all routers in network 120 with OSPF agents to forward the packet to all other routers to which they have connectivity. Because the OSPF packet is an Opaque LSA, routers that do not support the approach herein (for example, network element 130 of network 120 in FIG. 1) do not modify the contents of the packet, but always forward the OSPF packets to peers. Therefore, the information elements describing attributes, capabilities and services of network element 102A are propagated throughout the network rapidly and without modification. Further, a receiving network element that implements the approaches herein, such as network element 102B, can extract the information about attributes, capabilities or services and use that information, as now described.

Since any change in the opaque information that is propagated causes a change in the opaque LSA, in an OSPF implementation LSA flooding may occur. To reduce the likelihood of flooding in the network, routing protocol discovery logic 108A can accumulate changes in capabilities or services over a specified period of time, and send an OSPF Opaque LSA to advertise an updated set of attributes, capabilities or services only at specified intervals. For example, attributes, capabilities or services of a node or router can be advertised using the approach herein only once per day or once per 12 hours. Alternatively, only significant changes in attributes, capabilities or services can be advertised. Further, the opaque information can be broken down into fragments to reduce flooding overhead.

Referring now to FIG. 3, step 302 comprises receiving, from a network node, a particular message that conforms to a network routing protocol and includes one or more information elements that specify one or more capabilities or services. For example, network element 102B receives the OSPF packet that network element 102A sent at step 208 of FIG. 2.

In step 304, an identification of the node that sent the message, in association with the information elements that specify one or more attributes, capabilities or services, are stored in a data repository. For example, network element 102B stores, in an SNMP MIB, database, or other data repository, information identifying network element 102A and the contents of the OSPF Opaque LSA that was received. Identifying information can comprise a router name, source IP address, label value, etc.

Step 304 can involve storing the Opaque LSA as an atomic object in the repository, or parsing the Opaque LSA to identify particular information elements. For example, network elements 102A, 102B can host the same version of routing protocol discovery logic 108A, 108B, which can implement a particular format for the information in an Opaque LSA that advertises attributes, capabilities or services. The format can specify an order of name, value pairs, or a header followed by a capabilities list, etc. The particular schema used to organize data within the Opaque LSA is not critical, and if both network elements 102A, 102B support the same logic, then a receiving network element can parse and determine what capabilities or services are represented in the Opaque LSA.

At step 306, the receiving network element determines one or more attributes, services or capabilities that the information elements describe. Step 306 can involve parsing data that was stored in the repository, or correlating parsed data in the repository to other data to result in an identification of a particular attribute, capability or service. Step 306 also can comprise passing the information elements to application 110B, which can then parse or interpret the information elements to determine attributes, capabilities or services of network element 102A. Thus, step 306 broadly represents any action taken within network element 102B to determine what attributes, capabilities or services are represented in the received information elements and how they can be used.

In step 308, a request for one or more of the services or capabilities is sent. For example, in step 306 network element 102B determines that the other network element 102A hosts an enterprise user-role database, and that application 110B needs to determine an enterprise role for a user named "john_doe"; therefore, network element 102B forms and sends network element 102A a request to resolve the user name into a role. Thus, step 308 broadly represents any invocation by network element 102B of attributes, capabilities or services of network element 102A.

Further, FIG. 3 broadly represents the concept that a receiving network element implementing the approaches herein can discover, store information describing, and invoke the attributes, capabilities or services of another node in the network, by interpreting information carried in a payload of an opaque routing protocol message or packet that the other node advertises or floods using the routing protocol.

Accordingly, in an embodiment, a data processing apparatus comprises instructions to perform sending and receiving one or more messages conforming to Open Shortest Path First (OSPF) protocol; obtaining one or more information elements that specify one or more capabilities of the apparatus; creating a particular OSPF message comprising an OSPF Opaque Link State Advertisement that includes the one or more information elements; and sending the particular OSPF message on one of the network interfaces. For example, a router or switch that implements a network routing protocol can use opaque information elements in routing protocol packets to discover services and capabilities of other routers or switches.

For purposes of illustrating a clear example, certain parts of the description herein refer to OSPF Opaque LSAs. However, in other embodiments, other network layer routing protocols are adapted to enable a network infrastructure element, such as a router or switch, to discover services and capabilities of other network elements. For example, IS/IS can be used with new TLV definitions that carry service information. Further, EIGRP could be used with a new payload definition to carry service information. BGP extended communities may be used to carry service information in opaque payloads.

The approach herein provides numerous improvements over prior approaches. For example, using OSPF for service discovery results in fast discovery, because OSPF messages are processed rapidly within routers and propagate rapidly across networks. OSPF is widely implemented in nearly all routers and switches today, including AONS routers from Cisco Systems. Further, OSPF implements several security mechanisms, such as authentication and encryption on a per-link basis using IPSec hop-by-hop tunnels, and physical security to limit access to infrastructure devices. Typically MD5 message digest authentication is used, based on shared keys. The approach herein can leverage these existing mechanisms. Thus, communication of capabilities and services as provided herein occurs securely by using such mechanisms.

The approach herein also interoperates with existing network elements and imposes only a modest requirement upon network elements, such as network element 130 of FIG. 1, that do not support the particular approach herein; such elements are only required to support a routing protocol and to pass an opaque routing protocol message. In a network that uses Cisco routers as the network elements, Cisco IOS® Software already supports OSPF Opaque LSAs, and is capable of reliably transporting any OSPF opaque payload.

A further benefit of the approach herein is that existing nodes in the network do not require manual reconfiguration with information about services or capabilities of a new or additional node that is deployed in the network. If the new node is configured with information about its capabilities or services, the new node can advertise the capabilities and services using the approach herein and all other existing nodes in the network will automatically acquire corresponding capability and service information.

Further, no new protocol or additional protocol is needed to implement service discovery; an existing routing protocol can be used in an embodiment.

Implementations that use OSPF can benefit from the short convergence time of OSPF. For example, because OSPF link state advertisement mechanisms allow a large number of widely distributed routers to rapidly converge on a common set of reachability information, with the approach herein an outage of service provided by a particular network element or the loss of a particular capability at a particular network element is detected quickly. As a result, other nodes can direct further traffic to different nodes in network that provide a required capability or a desired service. Thus, the approach herein can provide a "self healing" network in which available services or capabilities of network elements 102A, 102B are known rapidly.

When a network element uses the approach herein to advertise that the network element is an AONS node, then using OSPF link state database information, reachability to other AON nodes can be determined dynamically. Examples of reachability information include number of hops, link load, etc.

4.0 Implementation Mechanisms—Hardware Overview

Figure 4:
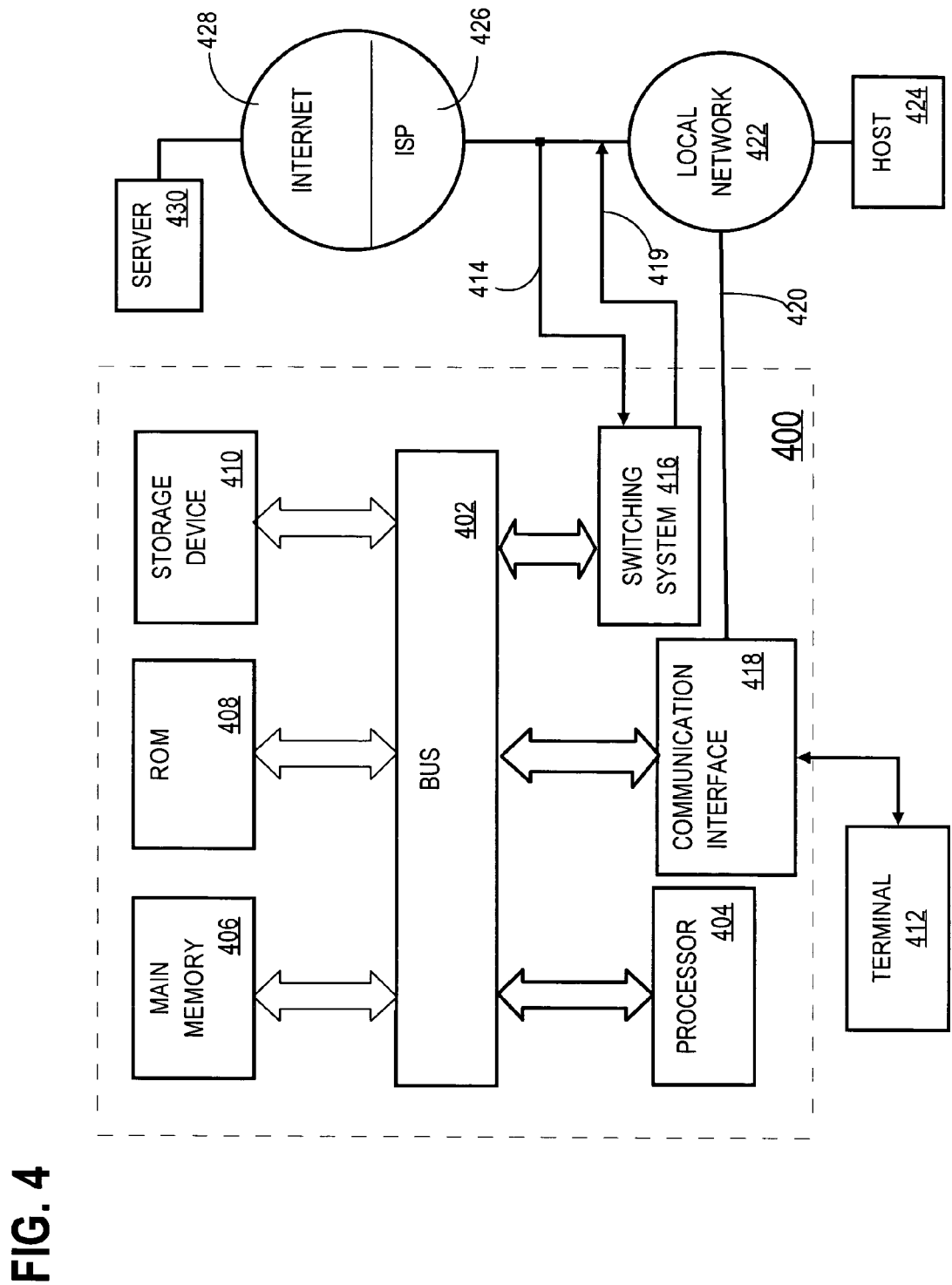
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for network element capability discovery using a network routing protocol. According to one embodiment of the invention, network element capability discovery using a network routing protocol is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for network element capability discovery using a network routing protocol as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus, comprising:
   one or more processors;
   one or more network interfaces coupled to the processors and communicatively coupled to a telecommunications network;
   a computer-readable medium comprising one or more sequences of one or more instructions which, when executed by the one or more processors, cause the one or more processors to perform:
   sending and receiving one or more messages conforming to a link state network routing protocol that uses advertisement messages;
   obtaining one or more information elements that specify one or more capabilities of the apparatus, wherein the one or more information elements comprise:
     a policy used by a software element hosted on the apparatus; and a digital certificate for a software element hosted on the apparatus;
     creating a particular message that conforms to a network routing protocol and comprises an opaque advertisement that includes the one or more information elements; and
   sending the particular message on one or more network interfaces.

2. The apparatus of claim 1, further comprising sequences of instructions which, when executed by the processor, cause the processor to perform:
   receiving, from a node that is coupled to the network, a second particular message comprising a second opaque advertisement that includes one or more second information elements that describe one or more capabilities of the node;
   storing, in a data repository of the apparatus, an identification of the node in association with the one or more second information elements;
   determining one or more capabilities that the one or more second information elements describe; and
   creating and sending to the node, a request for the one or more capabilities.

3. The apparatus of claim 1, wherein the one or more information elements describe a processing load metric for the apparatus.

4. The apparatus of claim 1, wherein the network routing protocol is any of Open Shortest Path First (OSPF) and Intermediate System/Intermediate System (IS/IS).

5. The apparatus of claim 1, wherein the one or more information elements describe any of: a role of the apparatus or one or more compression algorithms available on the apparatus.

6. An apparatus, comprising:
   one or more processors;
   means for sending and receiving one or more messages conforming to a link state network routing protocol that uses advertisement messages;
   means for obtaining one or more information elements that specify one or more capabilities of the apparatus, wherein the one or more information elements comprise:
     a policy used by a software element hosted on the apparatus; and a digital certificate for a software element hosted on the apparatus;
   means creating a particular message that conforms to a network routing protocol and comprises an opaque advertisement that includes the one or more information elements; and means for sending the particular message on one or more network interfaces.

7. The apparatus of claim 6, further comprising:
means for receiving, from a node that is coupled to the network, a second particular message comprising a second opaque advertisement that includes one or more second information elements that describe one or more capabilities of the node;
means for storing, in a data repository of the apparatus, an identification of the node in association with the one or more second information elements;
means for determining one or more capabilities that the one or more second information elements describe; and
means for creating and sending to the node, a request for the one or more capabilities.

8. The apparatus of claim 6, wherein the one or more information elements describe a processing load metric for the apparatus.

9. The apparatus of claim 6, wherein the one or more information elements describe any of: a role of the apparatus or one or more compression algorithms available on the apparatus.

10. A machine-implemented method comprising:
sending and receiving one or more messages conforming to a link state network routing protocol that uses advertisement messages;
obtaining one or more information elements that specify one or more capabilities of a first node, wherein the one or more information elements comprise:
a policy used by a software element hosted on the first node; and a digital certificate for a software element hosted on the first node;
creating a particular message that conforms to a network routing protocol and comprises an opaque advertisement that includes the one or more information elements; and
sending the particular message on one or more network interfaces;
wherein the method is performed by one or more processors.

11. The method of claim 10, further comprising:
receiving, from a second data processing node that is coupled to the network, a second particular message comprising a second opaque advertisement that includes one or more second information elements that describe one or more capabilities of a second node;
storing, in a data repository of the first node, an identification of the second node in association with the one or more second information elements;
determining one or more services that the one or more second information elements describe; and
creating and sending to the second node, a request for the one or more capabilities.

12. The method of claim 10, wherein the network routing protocol is any of Open Shortest Path First (OSPF) and Intermediate System/Intermediate System (IS/IS).

13. The method of claim 10, wherein the one or more information elements describe any of: a role of the apparatus or one or more compression algorithms available on the apparatus.

14. A non-transitory computer-readable storage medium, comprising volatile or non-volatile media, storing one or more sequences of instructions, which instructions, when executed by one or more processors, cause the one or more processors to perform:
sending and receiving one or more messages conforming to a link state network routing protocol that uses advertisement messages;
obtaining one or more information elements that specify one or more services of a first node, wherein the one or more information elements comprise:
a policy used by a software element hosted on the first node; and a digital certificate for a software element hosted on the first node;
creating a particular message that conforms to a network routing protocol and comprises an opaque advertisement that includes the one or more information elements; and
sending the particular message on one or more network interfaces.

15. The non-transitory computer-readable storage medium of claim 14, further comprising sequences of instructions which, when performed by the one or more processors, cause the one or more processors to perform:
receiving, from a second data processing node that is coupled to the network, a second particular message comprising a second opaque advertisement that includes one or more second information elements that describe one or more services of a second node;
storing, in a data repository of the first node, an identification of the second node in association with the one or more second information elements;
determining one or more capabilities that the one or more second information elements describe; and
creating and sending to the second node, a request for the one or more capabilities.

16. The non-transitory computer-readable medium of claim 14, wherein the one or more information elements describe any of: a role of the apparatus or one or more compression algorithms available on the apparatus.

* * * * *